United States Patent
Velayuthaperumal

(10) Patent No.: US 11,436,151 B2
(45) Date of Patent: Sep. 6, 2022

(54) SEMI-SEQUENTIAL DRIVE I/O PERFORMANCE

(71) Applicant: Seagate Technology LLC, Cupertino, CA (US)

(72) Inventor: Gomathirajan Authoor Velayuthaperumal, Bangalore Karnataka (IN)

(73) Assignee: Seagate Technology LLC, Cupertino, CA (US)

( * ) Notice: Subject to any disclaimer, the term of this patent is extended or adjusted under 35 U.S.C. 154(b) by 59 days.

(21) Appl. No.: 16/115,882

(22) Filed: Aug. 29, 2018

(65) Prior Publication Data

US 2020/0073814 A1 Mar. 5, 2020

(51) Int. Cl.
*G06F 12/0891* (2016.01)
*G06F 12/0804* (2016.01)
*G06F 12/02* (2006.01)
*G06F 13/42* (2006.01)
*G06F 12/0868* (2016.01)

(52) U.S. Cl.
CPC ...... *G06F 12/0891* (2013.01); *G06F 12/0246* (2013.01); *G06F 12/0804* (2013.01); *G06F 12/0868* (2013.01); *G06F 13/4221* (2013.01); *G06F 2212/7201* (2013.01)

(58) Field of Classification Search
CPC .. G06F 12/0891; G06F 12/0246; G06F 12/08; G06F 12/804; G06F 12/02; G06F 12/122; G06F 12/0868; G06F 13/4221
See application file for complete search history.

(56) References Cited

U.S. PATENT DOCUMENTS

| | | | |
|---|---|---|---|
| 5,596,736 A * | 1/1997 | Kerns | G06F 12/0804 711/170 |
| 5,890,211 A | 3/1999 | Sokolov et al. | |
| 5,890,212 A | 3/1999 | Sokolov et al. | |
| 5,890,213 A | 3/1999 | Sokolov | |
| 5,915,260 A | 6/1999 | Sokolov | |
| 5,920,887 A | 7/1999 | Sokolov et al. | |
| 5,937,426 A | 8/1999 | Sokolov | |
| 5,954,801 A | 9/1999 | Sokolov | |
| 5,966,726 A | 10/1999 | Sokolov | |

(Continued)

OTHER PUBLICATIONS

Geisei, Gina, "SAS: The Next Evolution of SCSI", wikibon.com, Available at wikibon.org/wiki/v/SAS:_The_Next_Evolution_of SCSI, Apr. 5, 2011.*

(Continued)

*Primary Examiner* — Prasith Thammavong
(74) *Attorney, Agent, or Firm* — Kagan Binder, PLLC

(57) ABSTRACT

A method includes receiving a request for a cache operation at a first storage device and identifying at least a first input/output operation at a first data block at the first storage device, the first data block having a corresponding first data range. The method also includes identifying a second input/output operation at a second data block having a corresponding second data range and initiating a read operation at the first storage device that comprises the first data block and the second data block. The method further includes combining the first data block and the second data block into a first data volume and writing the first data volume to a second storage device as a third input/output operation.

19 Claims, 10 Drawing Sheets

(56) References Cited

U.S. PATENT DOCUMENTS

| | | | |
|---|---|---|---|
| 5,970,508 A | 10/1999 | Howe et al. | |
| 6,092,149 A | 7/2000 | Hicken et al. | |
| 7,111,092 B1* | 9/2006 | Mitten | G06F 13/4221 |
| | | | 370/412 |
| 7,376,784 B2 | 5/2008 | Espeseth et al. | |
| 7,603,530 B1 | 10/2009 | Liikanen et al. | |
| 7,617,358 B1 | 11/2009 | Liikanen et al. | |
| 7,685,360 B1 | 3/2010 | Brunnett et al. | |
| 8,019,925 B1 | 9/2011 | Vogan et al. | |
| 9,552,297 B2 | 1/2017 | Traut et al. | |
| 9,594,652 B1* | 3/2017 | Sathiamoorthy | G06F 11/2053 |
| 9,619,169 B1 | 4/2017 | Throop et al. | |
| 9,684,455 B2 | 6/2017 | Traut et al. | |
| 9,710,383 B1* | 7/2017 | Xu | G06F 12/0246 |
| 10,664,408 B1* | 5/2020 | Chatterjee | G06F 13/1668 |
| 10,922,231 B1* | 2/2021 | Gray | G06F 12/0895 |
| 2003/0210248 A1* | 11/2003 | Wyatt | G06F 12/0888 |
| | | | 345/557 |
| 2004/0073751 A1* | 4/2004 | Horrigan | G06F 12/0897 |
| | | | 711/E12.04 |
| 2004/0193786 A1* | 9/2004 | Inagaki | G06F 12/0246 |
| | | | 711/105 |
| 2006/0123200 A1* | 6/2006 | Ito | G06F 12/0804 |
| | | | 711/143 |
| 2007/0005894 A1* | 1/2007 | Dodge | G06F 12/0866 |
| | | | 711/170 |
| 2008/0005465 A1* | 1/2008 | Matthews | G06F 3/0619 |
| | | | 711/113 |
| 2008/0120463 A1 | 5/2008 | Ashmore | |
| 2008/0320266 A1 | 12/2008 | Levine | |
| 2009/0157974 A1* | 6/2009 | Lasser | G06F 12/0893 |
| | | | 711/135 |
| 2009/0222627 A1* | 9/2009 | Reid | G06F 12/0804 |
| | | | 711/135 |
| 2011/0252201 A1* | 10/2011 | Koren | G06F 11/1448 |
| | | | 711/135 |
| 2014/0304477 A1* | 10/2014 | Hughes | G06F 12/0891 |
| | | | 711/133 |
| 2015/0032972 A1* | 1/2015 | Sakthivelu | G06F 12/0804 |
| | | | 711/143 |
| 2016/0154743 A1* | 6/2016 | Pan | G06F 12/0868 |
| | | | 711/135 |
| 2016/0254743 A1* | 9/2016 | Han | H02M 1/4208 |
| | | | 323/205 |
| 2017/0337212 A1* | 11/2017 | Hayasaka | G06F 3/067 |
| 2018/0121133 A1 | 5/2018 | Bakke et al. | |
| 2018/0165196 A1* | 6/2018 | Bernat | G06F 13/1663 |
| 2019/0034345 A1* | 1/2019 | Hu | G06F 12/0844 |
| 2020/0242160 A1* | 7/2020 | Thomsen | G06F 16/901 |
| 2021/0208969 A1* | 7/2021 | Lyu | G06F 11/1004 |

OTHER PUBLICATIONS

Tyson, Jeff; "How computer memory works;" Apr. 3, 2017; How StuffWorks; available at: https://web.archive.org/web/20170403113825/ https://computer.howstuffworks.com/computer-memory3.htm (Year: 2017).*

Winsor, Donald; "Bus and cache memory organizations for multi-processors;" 1989; The University of Michigan; pp. 10-13; available at: http://tnm.engin.umich.edu/wp-content/uploads/sites/353/2017/12/donw.pdf (Year: 1989).*

Thornton, Scott; "The internal processor bus: data, address, and control bus;" Dec. 29, 2016; Microcontroller Tips; available at: https://www.microcontrollertips.com/internal-processor-bus-data-address-control-bus-faq/ (Year: 2016)*

"On Random vs. Streaming I/O Performance; Or Seek ( ), and You Shall Find—Eventually", simpsonlab.com, Available from: http://simpsonlab.github.io/2015/05/19/io-performance/, Simpson Lab, 13 pages, May 19, 2015.

* cited by examiner

SEMI-SEQUENTIAL DRIVE I/O PERFORMANCE

SUMMARY

Due to the nature of electronic computing architecture, it can be beneficial to use one or more high-speed cache to temporarily store data that has been commonly or frequently accessed, was recently accessed, or is probabilistically likely to be accessed in the future. A cache can be part of a storage hierarchy, and can be a software or hardware component. For example, data to be stored, or "cached," can use high-speed flash devices like solid-state devices (SSDs), which may utilize flash memory, static random access memory (SRAM), and other types of storage devices, as applicable, or a portion of a hard-disk drive (HDD) that has faster access speed that the rest of that drive. A cache may store a duplicate of a data block that is already stored on a primary, back-end storage medium, also termed a "backing store" or "source." By design, caches tend to be higher-speed than other associated storage devices (such as the backing store), but caches may have a trade-off of a more limited storage capacity. The terms cache and cache devices are used interchangeably, herein.

According to a first aspect of the present disclosure, a method is disclosed. The method includes receiving a request for a cache operation at a first storage device. The method also includes identifying at least a first input/output operation at a first data block at the first storage device, the first data block having a corresponding first data range. The method also includes identifying a second input/output operation at a second data block having a corresponding second data range. The method also includes initiating a read operation at the first storage device that comprises the first data block and the second data block. The method also includes combining the first data block and the second data block into a first data volume. And, the method also includes writing the first data volume to a second storage device as a third input/output operation.

According to a second aspect of the present disclosure, another method is disclosed. The method includes receiving a request for a cache operation at a first storage device. The method also includes identifying at least a first input/output operation at a first data block at the first storage device, the first data block having a corresponding first data range. The method also includes identifying a second input/output operation at a second data block having a corresponding second data range. The method also includes initiating a read operation at the first storage device that comprises the first data block and the second data block. The method also includes combining the first data block and the second data block for transmission via a first interface. And, the method also includes transmitting the first data block and the second data block to at least a second storage device in a single I/O operation.

According to a third aspect of the present disclosure, a system is disclosed. The system includes a processor operatively coupled to a storage device. According to the third aspect, the processor is configured to execute instructions, including the execution of instructions to perform a process. The process includes receiving a request for a cache operation at a first storage device. The process also includes identifying at least a first input/output operation at a first data block at the first storage device, the first data block having a corresponding first data range. The process also includes identifying a second input/output operation at a second data block having a corresponding second data range. The process also includes initiating a read operation at the first storage device that comprises the first data block and the second data block. The process also includes combining the first data block and the second data block into a first data volume. And, when the instructions are executed, the process also includes writing the first data volume to a second storage device.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
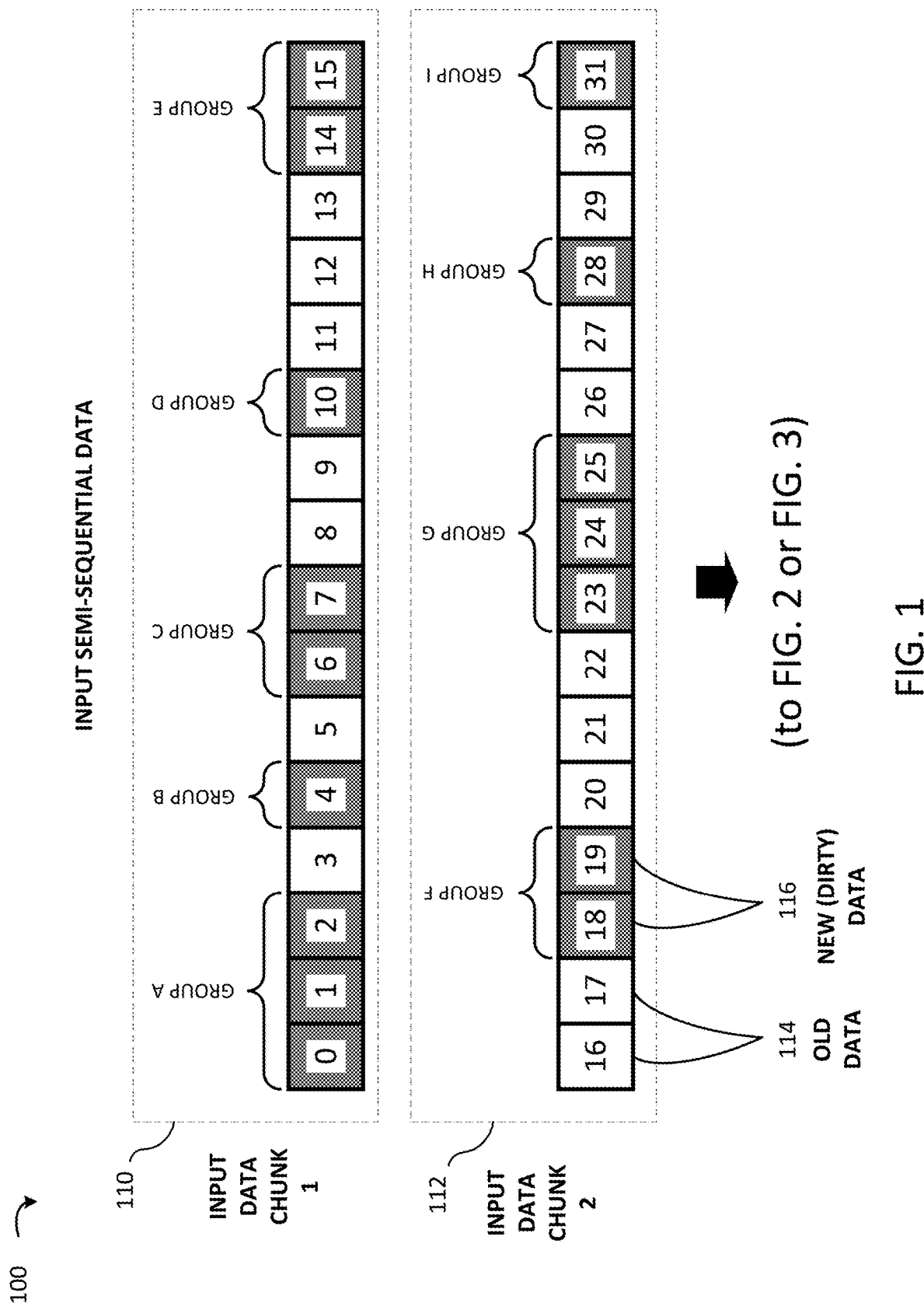
FIG. 1 graphically shows input semi-sequential data, including two data chunks that each include both old data and new data, according to various embodiments.

The present disclosure relates to improvements to redundant array of independent disks (RAID)-based storage system operation and implementation. In more detail, this disclosure relates to asynchronous cache flushing situations where multiple, but small, ranges of dirty data to be flushed in a cache input/output operation are detected within a particular data chunk size.

Caches can employ various modes of writing data to be cached to an associated backing store. These modes are known as "cache modes" or "write policies." Examples of write policies include write-through (WT) and write-back (WB). A backing store associated with a cache can constitute longer-term data storage means, that may be slower in data transfer rate and have longer latencies than caches. Very broadly, using a WT write policy includes writing to both a cache and the backing store synchronously, i.e., at substantially the same time. In contrast, a WB write policy involves an initial write to a cache only, followed by a marking corresponding metadata as dirty if not already so-marked. The corresponding write to the associated backing store would occur later, if at all.

As a result of synchronized writes in WT, cache data is typically non-persistent. For example, upon a possible system crash, the cache would become invalid, but no recovery would be needed as the cached data should already have been written to the appropriate backing store. Similarly, upon a system reboot the cache used for WT would become invalid. Note that these polices are limited to writing only, and do not typically apply to reading data. Generally speaking, a WT policy may be well-suited to a cache configured to be primarily read, and a WB policy may be well-suited to a cache configured for reading and/or writing. One or more metadata page tracking structure (MPTS) or other controllers, etc. can be employed to perform various described operations, as necessary. According to various embodiments, a first storage device can include a cache device or any other suitable storage device. And, in some embodiments, a second storage device can include a backing store or any other suitable storage device.

Some notable differences typically exist between the WT and WB writing policies. In particular, WB schemes generally utilizes asynchronous cache writes that include temporal sensitivity and that are situation-flexible. In contrast to the synchronous cache writes in WT, asynchronous cache writes typically involve an immediate write operation to the cache, but a delayed (or sometimes non-existent) write operation to the backing store. In WB, the cache writes can also be triggered by various events or circumstances, such as an indication that a particular cache block is about to be modified or overwritten with new content, or otherwise is directed to update the cache.

Presently, in a case where input/output (I/O) workloads on a cache are for example, semi-sequential, the cache associated with a corresponding backing store can include data write cache operations that leave the cache dirty in a corresponding semi-sequential nature. As described herein, a cache being dirty in a semi-sequential way, means that some, but not all of the data within a data chunk of the cache is dirty, for flushing (also known as destaging) at a point in time. At present, when the cache eventually attempts to flush the cache data to the backing store, one individual WB I/O operation is performed for each, sometimes small, dirty data range. This can lead to rapid saturation of cache queue depth of a particular data volume. In some cases, a RAID system that utilizes a small computer system interface (SCSI), serial-attached SCSI (SAS), or other transmission standard, presently sends a separate I/O transmission for each aforementioned data range, leading to slow transmission performance.

Disclosed are processes for improving cache performance, especially cache I/O performance, by grouping multiple update requests on a given metadata page. MPTS examples can optimize persistent metadata updates issued by user I/O write requests. Example MPTSs can be configured for grouping multiple update requests together that are otherwise individually and separately issued on the same metadata page. In place of a piecemeal approach, a single update would instead be issued on their behalf, as per the methods and systems described herein.

Storage controller write caches may be difficult to manage efficiently. For cache writes, where data is written to one or more backing store, such as a hard-disk drive (HDD), solid-state drive (SSD), or any other suitable back-end, usually slower but larger, storage device. Flushing data generally occurs asynchronously, or at various defined times based on other factors. Flushing write data is important as it frees up write cache space to accept new write requests from host computers, and the data is stored on storage devices in RAID configurations. Redundant, RAID configurations preserve data in the event of a single storage device failure—and in some RAID configurations—multiple storage device failures. It is therefore desirable to efficiently flush write data from a storage controller write cache to storage devices.

In more detail, the concept of a flushing operation or simply "flush" is an example of an I/O operation when a cache is caused to update at least one cache block of information to a backing store. A flush operation (or simply a "flush") can include reading data from the cache, writing it out to a backing store, followed by marking these cache blocks as "clean" in persistent cache metadata. The marking of the cache blocks after the flush operation can be a separate I/O operation, or can be part of the flush I/O operation in various embodiments.

After a flush, the affected cache blocks are then ready and available to be reused and overwritten, for example in a cache miss scenario, among other circumstances. Cache status (e.g., dirty/clean, valid/invalid, etc.) data can be stored in cache metadata, which can be stored within the cache itself. Some methods compulsorily update the persistent (backing store-based) cache metadata for every flush metadata I/O operation, sometimes sending updates between cache and backing store that include a substantial number of cache blocks that contain no useful information.

For a point of reference, an idealized cache would duplicate its cached data to a backing store instantly upon being written or modified. However, due to limitations in known computing architecture, it can be inefficient to immediately update a cache's backing store at every potential opportunity. A cache block that has been changed on the cache but not yet "mirrored" to the associated backing store is called a "dirty" cache block. Stated differently, a dirty cache block (e.g., of a cache) is a cache block containing data that presently exists only in the cache. The data is desired to be transmitted, but has not yet been transmitted to the more stable, larger, and slower, backing store. For an I/O write request that causes a clean cache block to become dirty, after completion of data write to cache, an in-memory stored copy of a dirty metadata bitmap (e.g., a type of data grid) is updated following which the cache metadata containing a dirty cache metadata bitmap is also updated to the cache.

According to the present disclosure, a cache controller (such as controller 10 of FIG. 10) can initiate a single read of old data, followed by writing all the old data and the new data as one large I/O, write-back operation. In so doing, read modifications can be implemented at the cache chunk level as an entire coalesced cache chunk-sized volume according to the cache, RAID type, backing store, and/or system characteristics. According to embodiments, a data chunk can be coalesced such that the chunk has a size according to a capacity of a single drive flush I/O operation. This is particularly useful in cases of semi-sequential workloads on RAID-based storage systems.

According to embodiments of the present disclosure, the terms "sequential," "semi-sequential," "non-sequential," and "substantially sequential" are used throughout with respect to data stored using or according to linear addressing schemes, such as logical block addressing (LBA), on a storage device, such as a cache or backing store. The above terms relating to sequential data aspects are defined and distinguishable. As used herein, sequential means an entire chunk size of cache data is dirty, and therefore needs to be flushed from the cache. In contrast, if a data chunk size is only partially dirty, that data can be characterized as being semi-sequential. Semi-sequential, as it relates to data, especially cache data, can also mean that there is an interleaved dirty data pattern inside the single data chunk size. Substantially sequential data can include data that is nearly sequential, and therefore dirtier than semi-sequential data, but that is not accurately characterized as being entirely sequential. In addition, the term "non-sequential" can refer to either of semi-sequential or substantially sequential.

In accordance with the present disclosure, other issues relating to storage device (e.g., drive) queue depth limits can also be alleviated. In particular, for some examples that utilize a small computer system interface (SCSI), or other transmission standard or interface, I/O WB operations each utilize a single logically-addressed (e.g., LBA) data block range, leading to a multiplicity of individual SCSI WB I/O operations and slow transmission performance, especially in cases where data for I/O operations is non-sequential. According to improvements described in the present disclosure, a SCSI protocol and/or interface can be improved to operate for multiple LBA data block I/O ranges instead of simply one data block per SCSI I/O operation.

As will be described in greater detail as following, embodiments of the present disclosure can lead to improved performance in view of storage limitations, such as limitations related to drive queues and the like.

FIG. 1 graphically shows input semi-sequential data 100, including two data chunks that each include both old data and new data, according to various embodiments.

As outlined above, cache data, such as new or "dirty" data, can be transferred to a backing store periodically in a process sometimes referred to as writing-back, destaging, or flushing of the dirty data. Such flushing is typically done either synchronously (as soon as possible, such as in a WT policy, described above) or asynchronously (queuing operations and then waiting until a preferable time to execute the operations, such as a WB policy). Flushing can transfer one or more data chunk that includes a number of data blocks, for example, addressed using LBA techniques.

Before cache data is caused to be flushed, such as input semi-sequential data 100, to one or more backing store for longer-term storage, various input data chunks can be identified, analyzed, and/or classified according to various aspects and/or metadata. For example, one aspect includes a number individual data blocks within each data chunk, and various data ranges or "groups" of the data blocks that constitute the data chunk. Furthermore, the input data chunks' individual data ranges can be segmented into consecutive groups that include either all new data 116 or all old data 114.

In some cases, a data chunk size is selected, calculated, or determined based on various physical, technical, or environmental characteristics of a corresponding system. For example, the number of data blocks included within a desired data chunk size can be defined by an inherent single drive I/O operation characteristic. Each of the data blocks of the corresponding data chunk can be identified (e.g., with the assistance of writing and/or reading related metadata) as being either old data 114 or new, dirty 116 data. As one example, two input data chunks are shown, including input data chunk 1 110, and input data chunk 2 112. More or fewer input data chunks can also be present in other embodiments. According to the shown embodiment, including input semi-sequential data 100, input data chunk 1 110 includes data blocks 0-15, and input data chunk 2 112 includes data blocks 16-31. Therefore, according to the shown embodiment, each input data chunk includes 16 data blocks, e.g., to be addressed using LBA techniques. In some embodiments, input data chunks 110, 112 could both include more data blocks, fewer data blocks, or different numbers of data blocks that each other in other embodiments.

Also shown are various sequential ranges of the data blocks, arranged as groups of the data blocks. As shown, nine groups of dirty data 116, labeled "group A" through "group I" (alphabetically) are identified. In other embodiments, old data 114 could also be classified by groups, if desired. As shown, each of groups A-I includes sequential ranges of data blocks, but in other embodiments, the groups could instead be constructed according to semi-sequential, non-sequential, or any other suitable data constructs.

As shown, input data chunk 1 includes sequential groups A through group E. In particular, data blocks 0-2 of input data chunk 1 110, group B includes data block 4 of input data block 1 110, group C includes data blocks 6 and 7 of input data block 1 110, and group E includes data blocks 14 and 15 also of input data block 1 110. Additionally, as shown, input data chunk 2 112 includes groups F through group I. In particular, group F includes data blocks 18 and 19 of input data chunk 2 112, group G includes data blocks 23-25 of input data chunk 2 112, group H includes data block 28 of input data chunk 2 112, and group I includes data block 31 of input data chunk 2 112.

Figure 2:
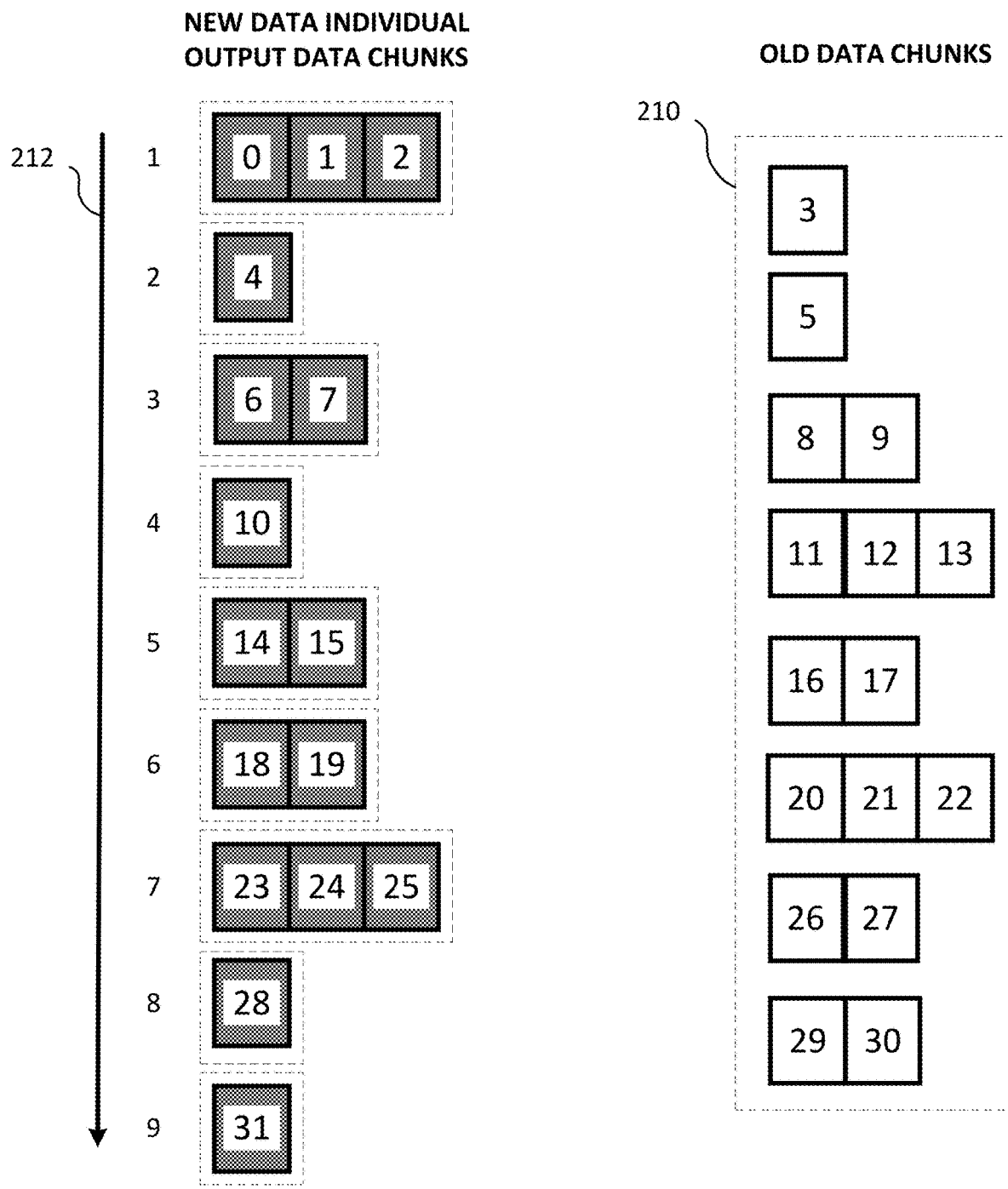
FIG. 2 graphically shows a scheme where individual old and new data chunks are prepared for output, according to various embodiments.
Figure 3:
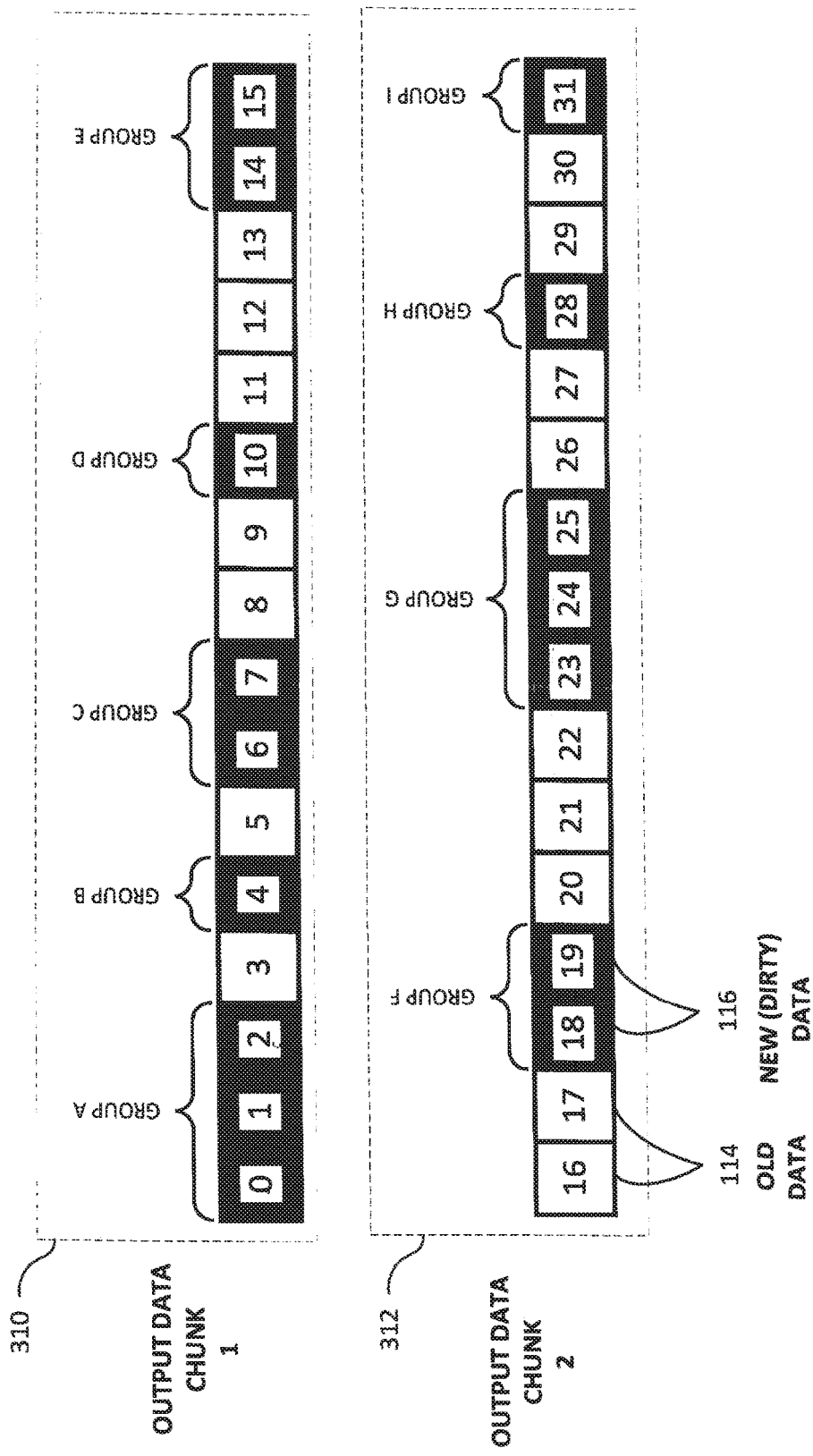
FIG. 3 graphically shows combined data chunks for output, according to various embodiments.

The input semi-sequential data 100 of FIG. 1 can then be flushed to the corresponding backing store either according to an example of a scheme at FIG. 2, or according to various embodiments of the present disclosure according to FIG. 3. Each will be discussed below in turn.

FIG. 2 graphically shows a scheme 200 where individual old and new data chunks are prepared for output, according to various embodiments.

Based on the input data chunks 110 and 112 of FIG. 1, scheme 200 takes new data individual data output data chunks 1-9 (e.g., based on groups A-I) and prepares each individual data output data chunk of chunk 1-9 as an individual data chunk. Therefore, nine data chunks are prepared as data chunks 1-9, to be transmitted for example in ascending numerical order from 1-9, according to transmission order vector 212.

As shown, old data chunks 210 are generally not output to a backing store according to scheme 200. It is noted that a data block coalescing logic can be implemented to the data chunks 1-9 (containing LBA data blocks 0-31) at the corresponding backing store, to group flushed cache data once the nine I/O operations are completed in order to efficiently store the flushed data blocks upon transfer to the backing store.

Although the cache data is flushed to the backing store according to scheme 200, performance is impaired by the number of flushing transmissions required for the cache data to be flushed to the backing store, and the corresponding computing resources and time necessary to do so.

FIG. 3 graphically shows scheme 300, where data chunks are combined for output, according to various embodiments.

As noted above, minimizing a number of I/O operations between a cache and a backing store is desirable in order to optimize cache performance. With the characteristics of some schemes highlighted with respect to scheme 200 of FIG. 2, scheme 300 illustrates an improved framework by which cache performance can be improved.

Scheme 300, while also based on the input data chunks 110 and 112 of FIG. 1, represents an example of an improved WB or flushing scheme 300, according to the present disclosure. In contrast to scheme 200, improved scheme 300 uses, and indeed would have a need for, only two output data chunks 310 and 312 in order to transmit the same data blocks 0-31 to the backing store. Groups A-I of new, dirty data blocks are included in output data chunk 1 310 and output data chunk 2 312, as can be the various old data 116 embodied in data blocks 3, 5, 8, 9, 11-13, 16, 17, 20-22, 26, 27, 29, and 30, as shown.

Also as shown, input data blocks 0-15 are coalesced into output data chunk 1 310, and input data blocks 16-31 are coalesced into output data chunk 2 312. A data chunk size can be determined based on a particular storage device or drive, or can be preset according to predetermined preferences. A user can also set or select a desired data chunk size. In other embodiments, a data chunk size can instead be determined dynamically, such as based on detected parameters, data, metadata, and/or conditions. In some embodiments, if new, dirty data is scattered within a chunk size, old data 114 can be read, and the old data 114, when output, can be written in the output data chunks 310, 312 together with the new 116 data as single, one full chunk of data.

Notably, a data coalescing operation with respect to the data blocks can occur prior to an I/O operation, whereby the data blocks are then transmitted to a backing store in a number of I/O operations that correspond to the number of selected output data chunks. A coalescing operation combines various data blocks into larger data chunks, e.g., for transmission, storage, etc. For example, as shown in scheme 300 of FIG. 3, only two I/O operations would be necessary to transmit (i.e., flush) data blocks 0-31 to the backing store, whereas in scheme 200, instead a total of nine I/O operations would be required to flush the same data blocks to the same backing store. As shown, according to scheme 300, the old data would not be included in the I/O operations. However, it is noted that old data should already have been flushed to the appropriate backing store, hence the data being considered old.

Figure 4:
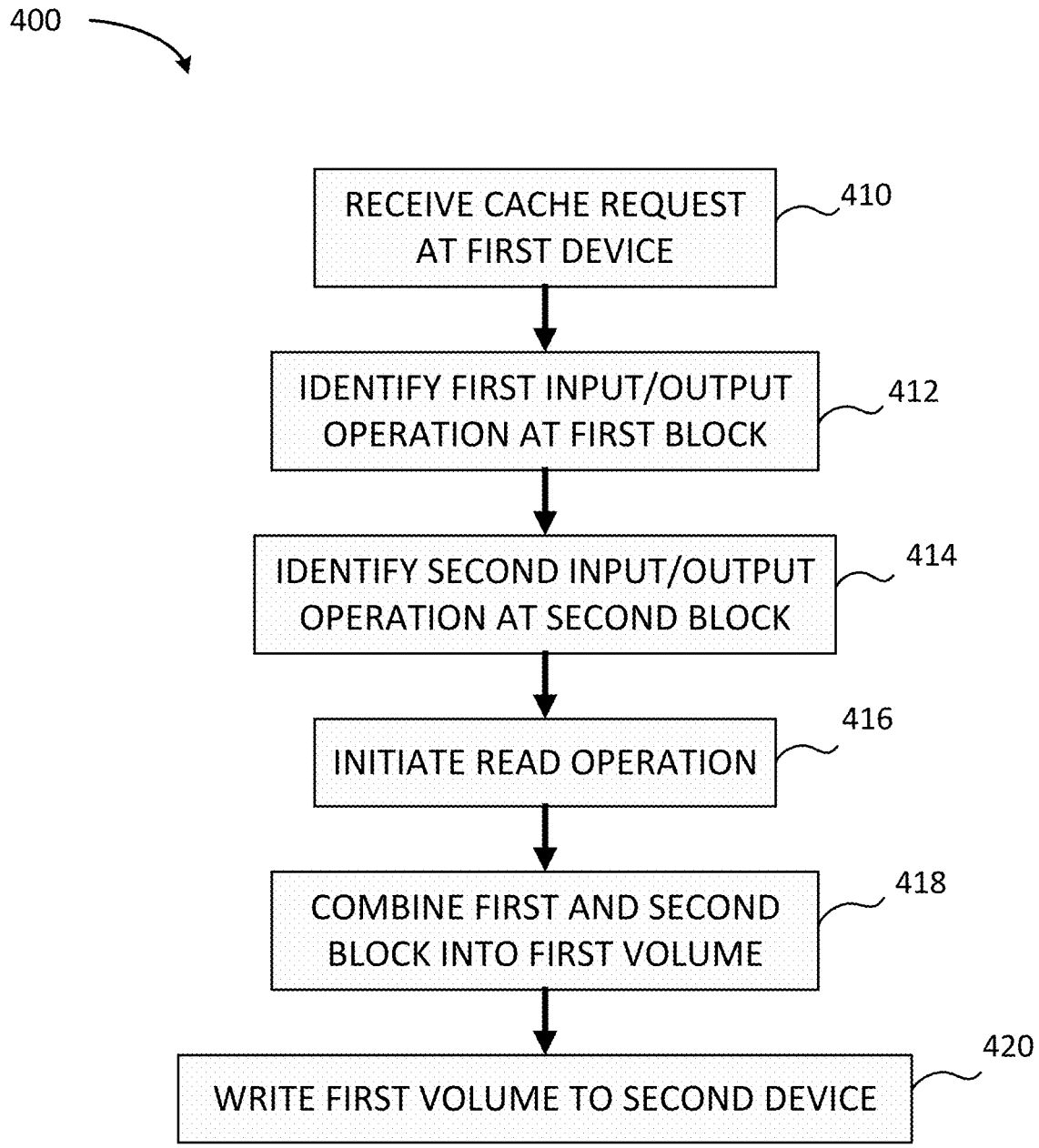
FIG. 4 is a flowchart of a method for improved input/output performance, according to various embodiments.

FIG. 4 is a flowchart of a method 400 for improved input/output performance, according to various embodiments.

Method 400 begins at operation 410 by receiving a request for a cache operation at a first storage device, such as a cache. The cache operation can be a flush operation in various embodiments. As described herein, a cache operation can include a flush or other I/O operation, which can be defined as being the same cache operation. Other cache operations are also contemplated. Next, at operation 412, at least a first I/O operation is identified at a first data block at the first storage device, where the first data block has a corresponding first data range, which can correspond to the groups A-I of data blocks as described with reference to FIGS. 1-3, above. At operation 414, a second I/O operation is identified at a second data block having a corresponding second data range.

Then, at operation 416, a read operation is initiated at the first storage device that comprises the first data block and the second data block. At operation 418, the first data block and the second data block are combined into a first data volume. The first data volume can correspond to an output data chunk, such as output data chunks 310 or 312 described with reference to FIG. 3. The first data volume can be a physical or a virtual data volume according to various embodiments. Then, at operation 420, the first data volume is written to a second storage device, such as a backing store, as an I/O operation. The I/O operation can take the form of a single data chunk. As used herein, a data chunk can be defined to include a data volume, and vice-versa.

Figure 5:
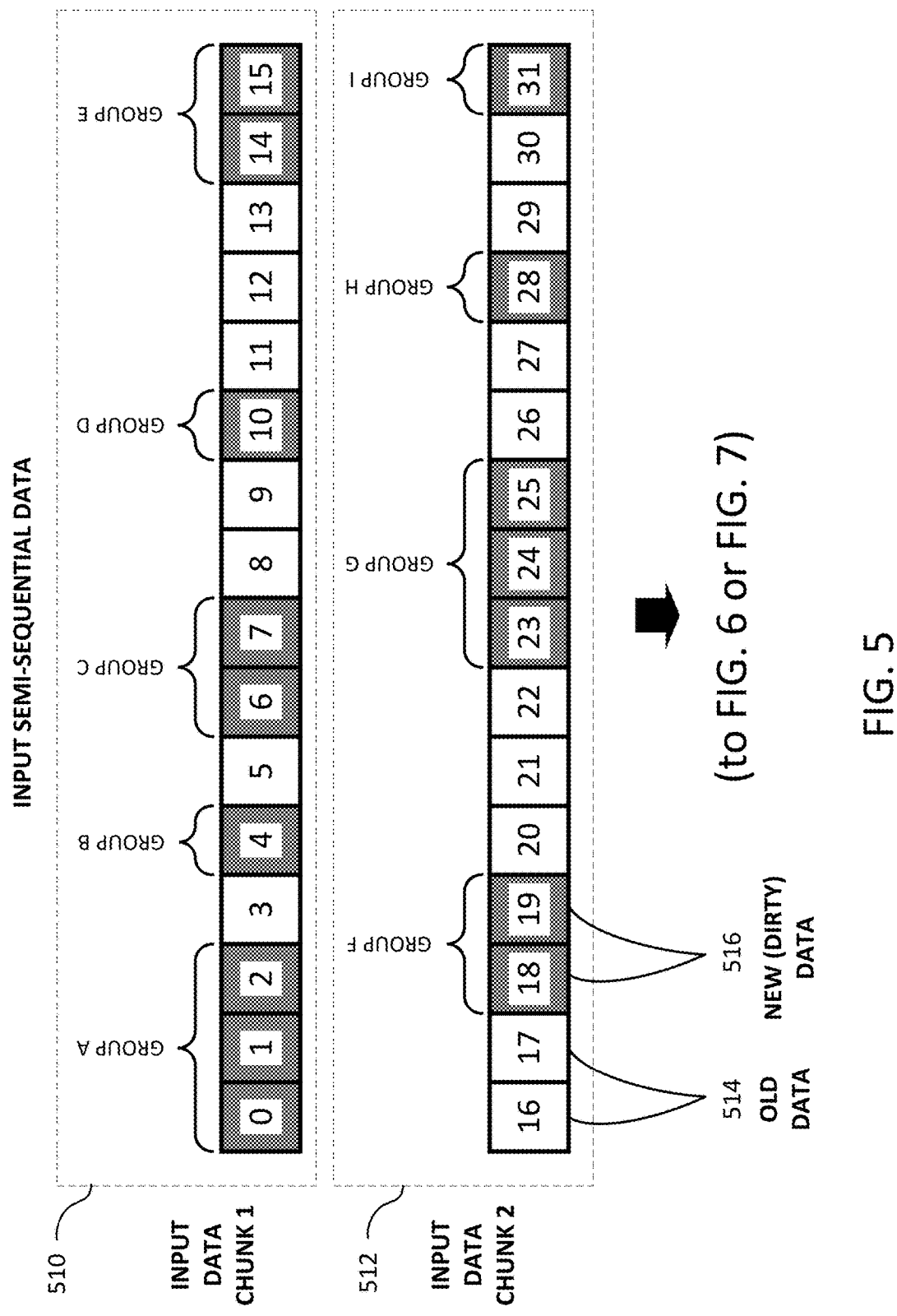
FIG. 5 graphically shows input semi-sequential data, including two data chunks that each include both old data and new data, according to various embodiments.

FIG. 5 graphically shows input semi-sequential data 500, including two data chunks that each include both old data and new data, according to various embodiments.

As referred to above with respect to FIG. 1, cache data, such as new or "dirty" data, can be transferred to a backing store periodically in a flushing process of the dirty data. Such flushing is typically done either synchronously (as soon as possible) or asynchronously (queuing operations and then waiting until a preferable time to execute the operations). Flushing can transfer one or more data chunk that includes a number of data blocks, for example, addressed using LBA techniques. One desirable data transfer protocol by which cache data is flushed to a backing store is SCSI, SAS, among others. Typically, each individual (LBA) data range of dirty data is transmitted using a SCSI I/O operation, which presently permits only the single data range to be transmitted in the single SCSI I/O operation.

As with the above discussion of FIG. 1, before flushing dirty cache data, such as input semi-sequential data 500, to one or more backing store for longer-term storage, various input data chunks can be identified, analyzed, and/or classified according to various aspects and/or metadata. For example, one aspect includes a number individual data blocks within each data chunk, and various data ranges or "groups" of the data blocks that constitute the data chunk. Furthermore, the input data chunks' individual data block ranges can be segmented into consecutive groups that include either all new data 516 or all old data 514.

Each of the data blocks of the corresponding data chunk can be identified (e.g., with the assistance of writing and/or reading related metadata) as being either old data 514 or new, dirty 516 data. As one example, two input data chunks are shown, including input data chunk 1 510, and input data chunk 2 512. More or fewer input data chunks can also be present in other embodiments. According to the shown embodiment, including input semi-sequential data 500, input data chunk 1 510 includes data blocks 0-15, and input data chunk 2 512 includes data blocks 16-31. Therefore, according to the shown embodiment, each input data chunk includes 16 data blocks, e.g., to be addressed using LBA techniques. It is noted that input data chunks 510, 512 could both include more data blocks, fewer data blocks, or different numbers of data blocks that each other in other embodiments.

Also shown, are various sequential ranges of the data blocks, arranged as groups of the data blocks. As shown, nine groups of dirty data 516 blocks, labeled "group A" through "group I" (alphabetically, and similar to FIG. 1) are identified. In other embodiments, old data 514 could also be classified by groups, if desired.

As shown, input data chunk 1 510 includes groups A through group E. In particular, data blocks 0-2 of input data chunk 1 510, group B includes data block 4 of input data block 1 510, group C includes data blocks 6 and 7 of input data block 1 510, and group E includes data blocks 14 and 15 also of input data block 1 510. Additionally, as shown, input data chunk 2 512 includes groups F through group I. In particular, group F includes data blocks 18 and 19 of input data chunk 2 512, group G includes data blocks 23-25 of input data chunk 2 512, group H includes data block 28 of input data chunk 2 512, and group I includes data block 31 of input data chunk 2 512.

Figure 6:
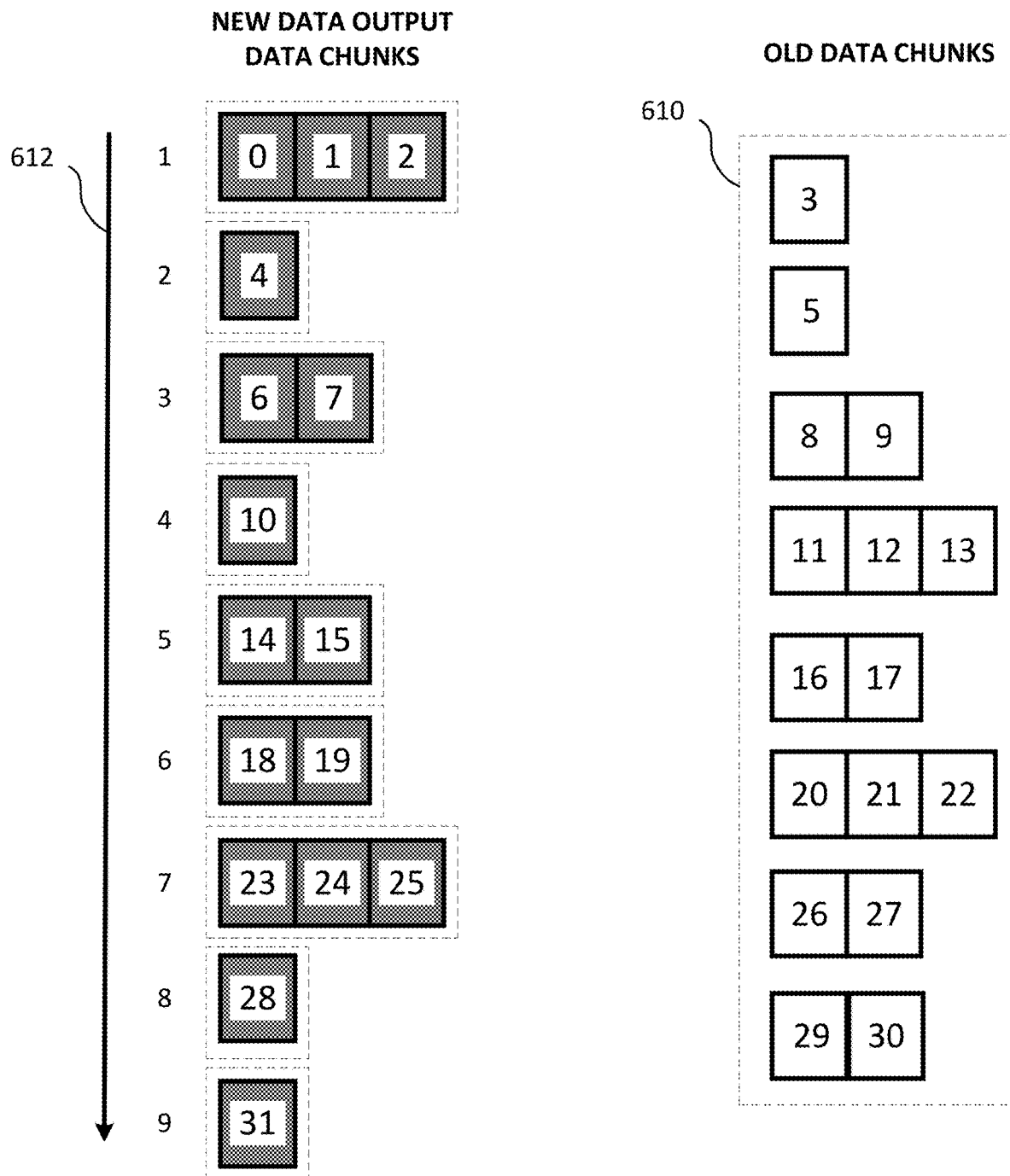
FIG. 6 graphically shows individual old and new data chunks for output, according to various embodiments.
Figure 7:
FIG. 7 graphically shows combined data chunks for output, according to various embodiments.

The input semi-sequential data 500 of FIG. 5 can then be flushed to the corresponding backing store using one or more SCSI protocol I/O operation, either according to an example of a prior art scheme at FIG. 6, or according to various embodiments of the present disclosure according to FIG. 7. Each will be discussed below in turn.

FIG. 6 graphically shows a scheme 600 where individual old and new data chunks are prepared for output, according to various embodiments.

Based on the input data chunks 510 and 512 of FIG. 5, scheme 600 takes new data individual data output data chunks 1-9 (e.g., based on groups A-I) and prepares each individual data output data chunk of chunk 1-9 as an SCSI I/O output data range for a single SCSI I/O output. Therefore, nine data chunks (together containing data blocks 0-31) are prepared as data chunks 1-9, to be transmitted via SCSI in ascending numerical order from 1-9, according to transmission order vector 612. As shown, old data chunks 610 are not output via SCSI according to scheme 600.

It is noted that a data block coalescing logic can be implemented to the data blocks 1-9 at a backing store once the nine SCSI I/O operations are completed in order to efficiently store the flushed data blocks as data chunks of a suitable data granularity upon transfer to the backing store.

See Table 1, below for an example of an typical SCSI I/O parameters.

TABLE 1

TYPICAL SCSI I/O PARAMETERS

SCSI Operation Code
Protection Information
LBA
Numblocks

As shown with reference to Table 1, above, SCSI Operation Code can include protection information according to LBA and/or Numblocks. Numblocks can include a number, description, and/or type of data blocks according to the SCSI operation and/or the SCSI Operation Code. However, according to Table 1, only a single range of data blocks is assumed, as no references are made to more than one range of data blocks.

FIG. 7 graphically shows scheme 700, where data chunks are combined for output, according to various embodiments.

Minimizing a number of SCSI I/O operations between a cache and a backing store is desirable. The fewer SCSI I/O operations for a set amount of data blocks to be transferred, the better performance will generally be. Some SCSI protocol schemes are set up to transmit only a single LBA data range.

According to scheme 700, a first interface, such as an improved SCSI protocol, can be configured to include multiple data ranges, or "groups" in a single SCSI I/O operation. Scheme 700, while also based on the input data chunks 510 and 512 of FIG. 5, represents an example of an improved SCSI-based WB or flushing scheme 700, according to the present disclosure. In contrast to scheme 600, improved scheme 700 uses only two SCSI I/O operations corresponding to two output data chunks 710 and 712 in order to transmit the same data blocks 0-31 to the backing store. Groups A-I of new, dirty data are included in output data chunk 1 310 and output data chunk 2 312, as can be the various old data 116 embodied in, for example, data blocks 3, 5, 8, 9, 11-13, 16, 17, 20-22, 26, 27, 29, and 30, as shown.

As shown, input data blocks 0-15 are coalesced into output data chunk 1 710, and input data blocks 16-31 are coalesced into output data chunk 2 712, each configured to utilize a single SCSI I/O operation for transmission to the backing store. In some embodiments, the data blocks of each data chunk can be transmitted according to a single SCSI transmission having multiple data block ranges, but the data blocks may not be coalesced in so doing. A data chunk size can be determined based on a particular SCSI controller, storage device or drive, or can be preset according to predetermined preferences. In other embodiments, a SCSI I/O data chunk size can instead be determined dynamically, such as based on detected parameters, data, metadata, and/or conditions. In general, a data coalescing operation's details and characteristics can depend on a capability of a serial-attached SCSI (SAS) controller or other SAS-based device. According to some embodiments, a SAS controller can transfer up to a 1 MB range of data to a backing store drive in a single SCSI command.

As shown in scheme 700 of FIG. 7, only two SCSI I/O operations would be necessary to transmit (e.g., flush) data blocks 0-31 to the backing store, whereas in scheme 600, instead a total of nine SCSI I/O operations (e.g., flush operations) would be required to transmit the same data blocks, although the old data would optionally not be included in the I/O operations. In some embodiments, the scheme 700 can be implemented on standard or existing hardware, but with improvements or adjustments to the parameters in which hardware is implemented, controller, or caused to operate. At present, SCSI I/O operations can use a scatter and gather list in order to transfer data that is stored in a same or similar physical LBA range at the backing store drive, where the data is logically distributed to multiple CPU memory locations during the SCSI I/O operations.

See Table 2, below, for an example of improved SCSI I/O parameters, according to various embodiments.

TABLE 2

IMPROVED SCSI I/O PARAMETERS

SCSI Operation Code
Protection Information
NumRanges
LBA
Numblocks
LBA
Numblocks
. . .
. . .

According to various embodiments, if the input data chunks 510, 512 contain multiple first approach chunk size I/Os, such as groups A-I of FIG. 5, a multiple-SCSI range command can be implemented as a single SCSI command, as opposed to multiple SCSI commands for each single chunk size as would be used in some SCSI schemes, such as shown and described with respect to FIG. 6, above. SCSI ranges can correspond to LBA ranges in various embodiments. As shown in Table 2, and with contrast to Table 1, above, a new feature, denoted NumRanges is included in the SCSI Operation Code. By including the NumRanges feature in the SCSI Operation Code, the code can include protection information according to LBA and/or Numblocks, but also information related to a number of ranges of data blocks, which can be transmitted (e.g., to a backing store) in a single SCSI I/O operation or transmission. Various NumRanges can be defined as data volumes using, for example, LBA, and each NumRange can include any number of groups of data blocks to be transmitted using various SCSI protocols (e.g., SAS).

Figure 8:
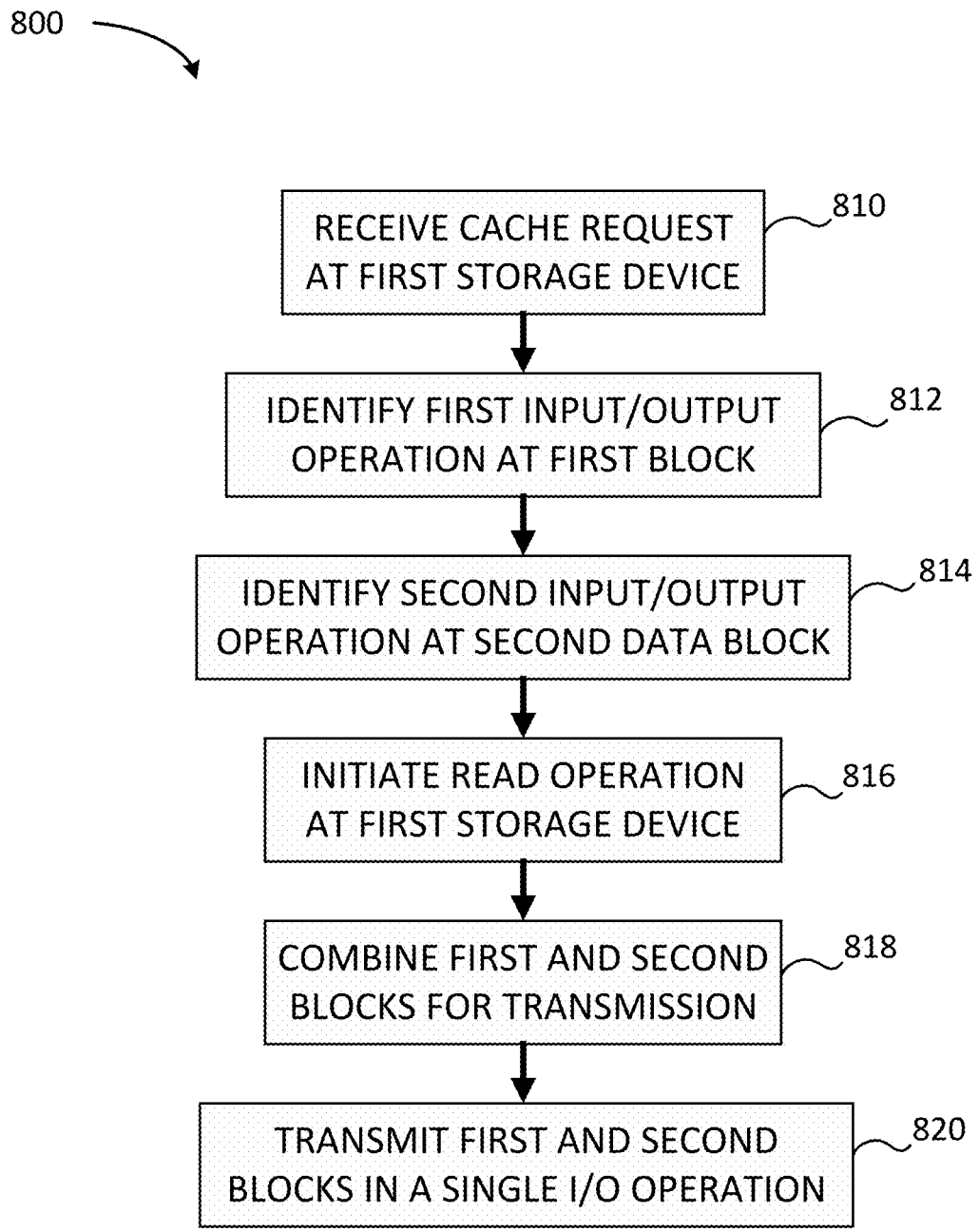
FIG. 8 is a flowchart of another method for improved input/output performance, according to various embodiments.

FIG. 8 is a flowchart of a method 800 for improved input/output performance, according to various embodiments.

Method 800 begins at operation 810 by receiving a request for a cache operation at a first storage device, such as a cache. The cache operation can be a flush operation in various embodiments. Next, at operation 812, at least a first I/O operation is identified at a first data block at the first storage device, where the first data block has a corresponding first data range, which can correspond to the groups A-I of data blocks as described with reference to FIGS. 5-7, above. At operation 814, a second I/O operation is identified at a second data block having a corresponding second data range.

Then, at operation 816, a read operation is initiated at the first storage device that comprises the first data block and the second data block. At operation 818, the first data block and the second data block are combined for transmission via SCSI. Then, at operation 820, the first data block and the second data block are transmitted to at least a second storage device in a single SCSI I/O operation. In some embodiments, the single SCSI I/O can include multiple LBA data ranges, such as the first data range and/or the second data range.

Figure 9:
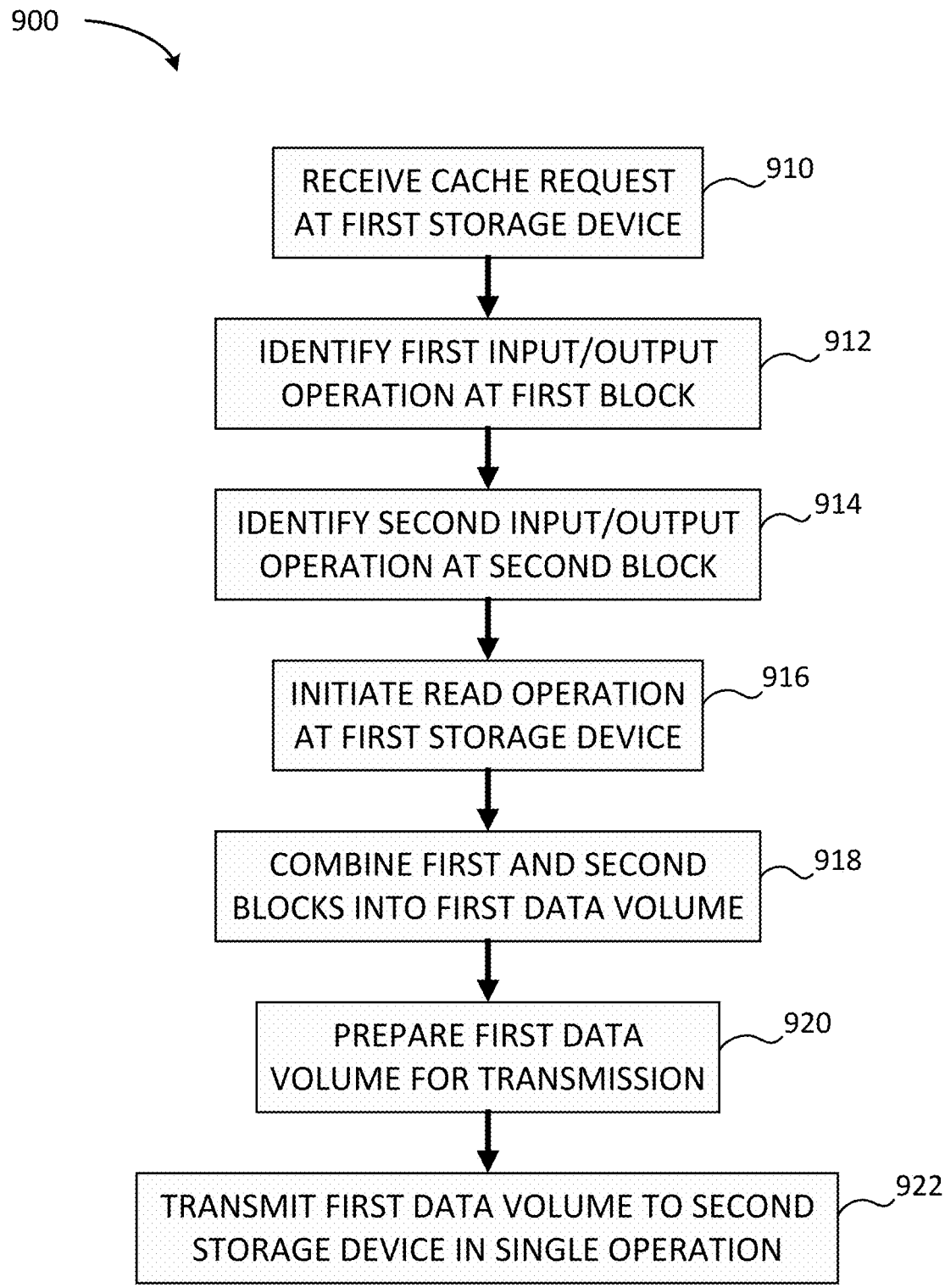
FIG. 9 is a flowchart of a yet another method for improved input/output performance, according to various embodiments.

FIG. 9 is a flowchart of a method 900 for improved input/output performance, according to various embodiments.

Method 900 begins at operation 910 by receiving a request for a cache operation at a first storage device, such as a cache. The cache operation can be a flush operation in various embodiments. Next, at operation 912, at least a first I/O operation is identified at a first data block at the first storage device, where the first data block has a corresponding first data range, which can correspond to the groups A-I of data blocks as described with reference to FIG. 1-3 or 5-7, above. At operation 914, a second I/O operation is identified at a second data block having a corresponding second data range. Various embodiments of the present disclosure can include variations where the actions of identifying and receiving are interchangeable according to particular situations, as suitable.

Then, at operation 916, a read operation is initiated at the first storage device that comprises the first data block and the second data block. At operation 918, the first data block and the second data block are combined into a first data volume. Then, at operation 920, the first data volume is prepared for transmission via a first interface, e.g., a SCSI, parallel, and/or serial interface. Finally, at operation 922, the first data volume is transmitted to at least a second storage device in a single I/O operation. In some embodiments, the single I/O can include multiple LBA data ranges (e.g., NumRanges, above), such as the first data range and/or the second data range. Also in some embodiments, the first interface is a SCSI interface. In yet other embodiments, the first interface is an SAS interface. Data range, as used herein, can be defined as being the same or similar to a NumRange, also used herein.

According to various embodiments, the first data range and the second data range are defined using LBA. In further embodiments, the first data volume is defined using LBA. In further embodiments, the first data volume is defined to have a size based on at least one characteristic of the first storage device. In some embodiments, the at least one characteristic of the first storage device includes a block size.

Figure 10:
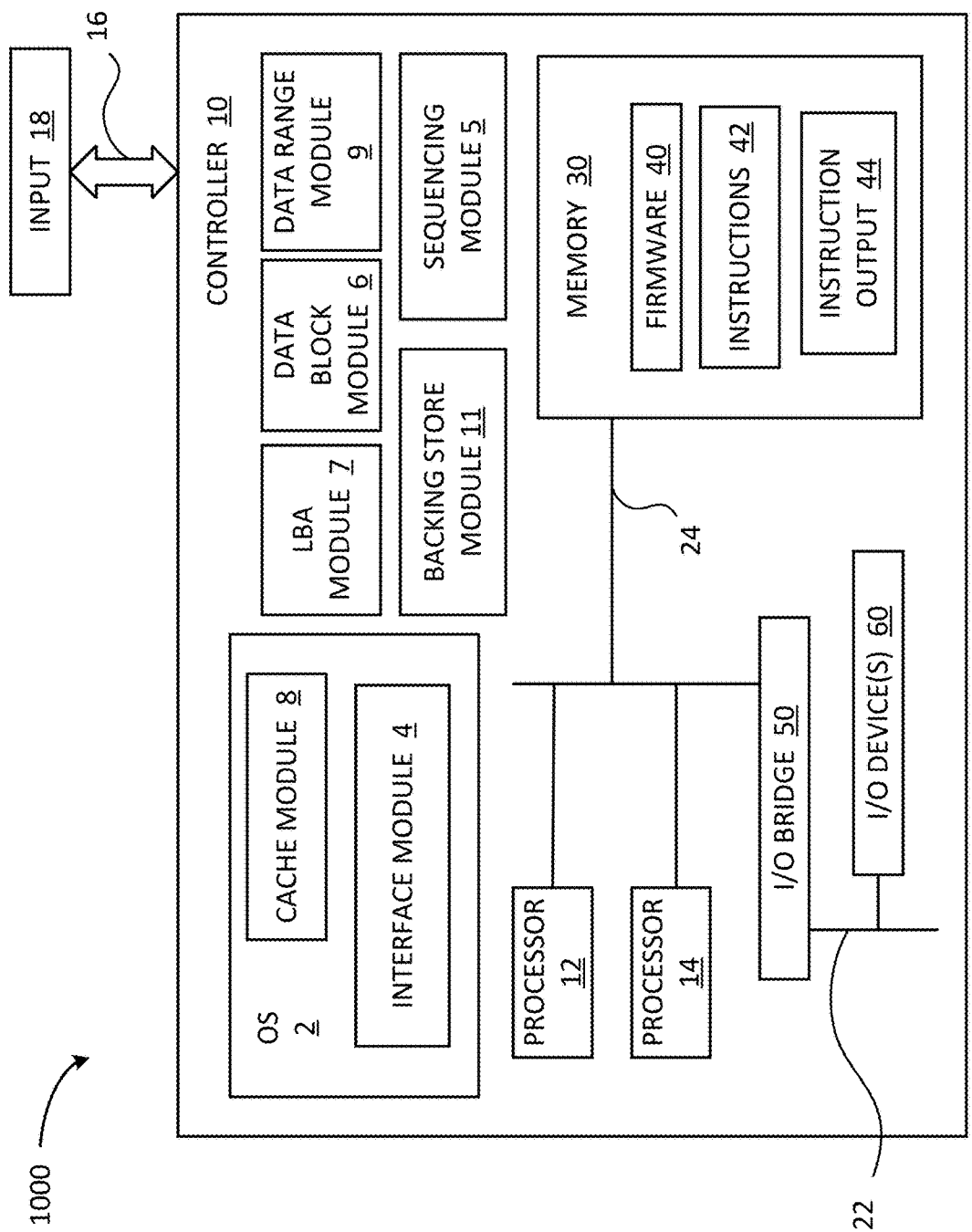
FIG. 10 is a block schematic diagram of a computer system, according to embodiments of the present disclosure.

FIG. 10 is a block schematic diagram of a computer system 1000 according to embodiments of the present disclosure.

Computer system 1000, as shown, is configured with an interface 16 to enable a controller 10 to receive a request to efficiently manage cache flushing. The controller 10 may be in communication with one or more cache through a cache module 8, and one or more hard-disk drive, backing store, or other storage device through backing store module 11, according to various embodiments. A sequencing module 5 and a cache module 8 stored on an operating system (OS) 2 may be configured to control flushing or other I/O operation activities. The controller 10 may also facilitate implementation and performance of various other methods, as described herein. The controller 10 may include various computing components, including a central processing unit in processors 12, 14, memory 30, storage components, and be include an OS 2 and/or firmware installed thereon. The various components of the controller 10 may be operatively or electrically connected to one another, and input/output device may be configured to interface with the controller 10 as described in more detail, below.

An input 18 may be received at interface 16. In embodiments, the interface 16 can enable controller 10 to receive, or otherwise access, the input 18 via, for example, a network (e.g., an intranet, or a public network such as the Internet), or a storage medium, such as a hard-disk drive internal or connected to controller 10. The interface 16 can be configured for human input or other input devices 60. It would be apparent to one of skill in the art that the interface can be any of a variety of interface types or mechanisms suitable for a computer, or a program operating in a computer, to receive or otherwise access or receive a source input or file.

Processors 12, 14 included in controller 10 are connected by a memory interface 24 to memory device or module 30. In embodiments, the memory 30 can be a cache memory, a main memory, a flash memory, or a combination of these or other varieties of electronic devices capable of storing information and, optionally, making the information, or locations storing the information within the memory 30, accessible to one or more processor 12, 14. Memory 30 can be formed of a single electronic (or, in some embodiments, other technologies such as optical) module or can be formed of a plurality of memory devices. Memory 30, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 1000 can include a plurality of memory devices. A memory interface, such as 24, between a one or more processors 12, 14 and one or more memory devices can be, for example, a memory bus common to one or more processors and one or more memory devices. In some embodiments, a memory interface, such as 24, between a processor (e.g., 12, 14) and a memory 30 can be point to point connection between the processor and the memory, and each processor in the computer 1000 can have a point-to-point connection to each of one or more of the memory devices. In other embodiments, a processor (e.g., 12) can be connected to a memory (e.g., memory 30) by means of a connection (not shown) to another processor (e.g., 14) connected to the memory (e.g., 24 from processor 12 to memory 30).

Computer 1000 can include an input/output (I/O) bridge 50, which can be connected to a memory interface 24, or to processors 12, 14. An I/O bridge 50 can interface the processors 12, 14 and/or memory devices 30 of the computer 1000 (or, other I/O devices) to I/O devices 60 connected to the bridge 50. For example, controller 10 includes I/O bridge 50 interfacing memory interface 24 to I/O devices, such as I/O device 60. In some embodiments, an I/O bridge 50 can connect directly to a processor or a memory, or can be a component included in a processor or a memory. An I/O bridge 50 can be, for example, a peripheral component interconnect express (PCI-Express) or other I/O bus bridge, or can be an I/O adapter.

An I/O bridge 50 can connect to I/O devices 60 through an I/O interface, or I/O bus, such as I/O bus 22 of controller 10. For example, I/O bus 22 can be a PCI-Express or other I/O bus. I/O devices 60 can be any of a variety of peripheral I/O devices or I/O adapters connecting to peripheral I/O devices. For example, I/O device 60 can be a graphics card, keyboard or other input device, a hard-disk drive, solid-state drive (SSD) or other storage device, a network interface card (MC), etc. I/O devices 60 can include an I/O adapter, such as a PCI-Express adapter, that connects components (e.g., processors or memory devices) of the computer 1000 to various I/O devices 60 (e.g., disk drives, Ethernet networks, video displays, keyboards, mice, styli, touchscreens, etc.).

Computer 1000 can include instructions 42 executable by one or more of the processors 12, 14 (or, processing elements, such as threads of a processor). The instructions 42 can be a component of one or more programs. The programs, or the instructions 42, can be stored in, and/or utilize, one or more memory devices of computer 1000. Memory 30 can also store one or more instruction output 44. As illustrated in the example of FIG. 10, controller 10 includes a plurality of programs or modules, such as cache module 8, interface module 4, LBA module 7, data block module 6, data range module 9, backing store module 11, and sequencing module 5. According to various embodiments, the interface module 4 can be an interface module that includes SAS functionality or other suitable SCSI functionality as appropriate. A program can be, for example, an application program, an operating system (OS) or a function of an OS, or a utility or built-in function of the computer 1000. A program can be a hypervisor, and the hypervisor can, for example, manage sharing resources of the computer 1000 (e.g., a processor or regions of a memory, or access to an I/O device) among a plurality of programs or OSes.

Programs can be "stand-alone" programs that execute on processors and use memory within the computer 1000 directly, without needing another program to control their execution or their use of resources of the computer 1000. For example, controller 10 includes (optionally) stand-alone programs in cache module 8, interface module 4, LBA module 7, data block module 6, data range module 9, backing store module 11, and sequencing module 5. A stand-alone program can perform particular functions within the computer 1000, such as controlling, or interfacing (e.g., access by other programs) an I/O interface or I/O device. A stand-alone program can, for example, manage the operation, or access to, a memory (e.g., memory 30). A basic I/O subsystem (BIOS), or a computer boot program (e.g., a program that can load and initiate execution of other programs) can be a stand-alone program.

Controller 10 within computer 1000 can include one or more OS 2, and an OS 2 can control the execution of other programs such as, for example, to start or stop a program, or to manage resources of the computer 1000 used by a program. For example, controller 10 includes OS 2, which can include, or manage execution of, one or more programs, such as OS 2 including (or, managing) cache module 8 and/or interface module 4. In some embodiments, an OS 2 can function as a hypervisor.

A program can be embodied as firmware (e.g., BIOS in a desktop computer, or a hypervisor) and the firmware can execute on one or more processors and, optionally, can use memory, included in the computer 1000. Firmware can be stored in a memory (e.g., a flash memory) of the computer 1000. For example, controller 10 includes firmware 40 stored in memory 30. In other embodiments, firmware can be embodied as instructions (e.g., comprising a computer program product) on a storage medium (e.g., a CD-ROM, DVD-ROM, flash memory, or hard-disk drive), and the computer 1000 can access the instructions from the storage medium.

In embodiments of the present disclosure, the computer 1000 can include instructions for efficiently managing cache flushes and/or other I/O operations. Controller 10 includes, for example, LBA module 7, data block module 6, data range module 9, backing store module 11, and sequencing module 5, which can operate, in conjunction with cache module 8, interface module 4, to efficiently manage cache I/O operations. The computer 1000 can utilize cache module 8, interface module 4, in a memory 30 of the computer 1000, such as controller 10 storing the various cache and disk data, and perform efficient flushing and/or other I/O operations in memory 30. According to various embodiments, the interface module 4 can include functionality or instructions that relate to various features of Tables 1 and/or 2, above. For example, the interface module 4 can be configured to store SCSI Operation Code, Protection Information, NumRanges, Numblocks, and can be configured to use LBA for various components and/or functionality.

The example computer system 1000 and controller 10 are not intended to limiting to embodiments. In embodiments, computer system 1000 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, the controller 10 can be, for example, a computing device having a processor (e.g., 12) capable of executing computing instructions and, optionally, a memory 30 in communication with the processor. For example, controller 10 can be a desktop or laptop computer; a tablet computer, mobile computing device, personal digital assistant (PDA), or cellular phone; or, a server computer, a high-performance computer (HPC), or a super computer. Controller 10 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of improving cache performance, comprising:
   receiving a request for a cache operation at a first storage device;
   identifying at least a first input/output operation at a first data block of a first data chunk, the first data block having a corresponding first data range within the first data chunk;
   identifying a second input/output operation at a second data block of the first data chunk, the second data block having a corresponding second data range within the first data chunk;
   initiating a read operation at the first data chunk stored on the first storage device that comprises the first data block and the second data block;
   combining the first data block and the second data block into a second data chunk comprising a predetermined number of consecutive coalesced data blocks corresponding to a single controller transmission operation, the second data chunk of consecutive coalesced data blocks having interleaved dirty data therein, wherein the single controller transmission operation is associated with a controller for use with the first storage device and a second storage device, and wherein the single controller transmission operation is defined to have the predetermined number of consecutive coalesced data blocks based on at least one input/output operation characteristic of the first storage device, the second storage device, or the controller; and
   writing the second data chunk of consecutive coalesced data blocks to the second storage device as a third input/output operation at the second storage device, wherein the third input/output operation is performed on consecutive data blocks of the second storage device based on the consecutive data blocks of the second data chunk.

2. The method of claim 1, wherein the first input/output operation at the first data block and the second input/output operation at the second data block are performed at non-consecutive data blocks with respect to the first storage device.

3. The method of claim 1, wherein the first storage device is a cache device, and the second storage device is a backing store corresponding to the cache device.

4. The method of claim 3, wherein the first input/output operation is selected from the group consisting of a cache read operation and a cache write operation.

5. The method of claim 1, wherein the first data range and the second data range are defined using logical block addressing, and wherein the second data chunk is a first data volume that is defined using logical block addressing.

6. The method of claim 1, wherein the first data chunk is an input data chunk and the second data chunk is an output data chunk.

7. The method of claim 1, wherein the predetermined number of consecutive coalesced data blocks of the second data chunk is determined dynamically and prior to the identifying the first input/output operation based on detecting at least one selected from the group consisting of: parameters, data, metadata, and conditions.

8. The method of claim 1, wherein third input/output operation is a serial-attached small-computer serial process.

9. A method of improving cache performance, comprising:
   receiving a request for a cache operation at a first storage device;
   identifying at least a first input/output operation at a first data block of an input data chunk comprising a predetermined first number of data blocks, the first data block having a corresponding first data range within the input data chunk;
   identifying a second input/output operation at a second data block of the input data block, the second data block having a corresponding second data range within the input data chunk, wherein the second data block is non-consecutive to the first data block;
   initiating a read operation at the input data chunk stored on the first storage device that comprises the first data block and the second data block;
   combining the first data block and the second data block into an output data chunk comprising a predetermined second number of consecutive coalesced data blocks corresponding to a single controller operation, the output data chunk of consecutive coalesced data blocks having interleaved dirty data therein for transmission via a first interface, wherein the single controller transmission operation is associated with a controller for use with the first storage device and a second storage device, and wherein the single controller transmission operation is defined to have the predetermined number of consecutive coalesced data blocks based on at least one input/output operation characteristic of the first storage device, the second storage device, or the controller; and
   transmitting the output data chunk of consecutive coalesced data blocks to at least the second storage device in a single, third input/output operation at the second storage device, wherein the third input/output operation is performed on consecutive data blocks of the second storage device based on the consecutive data blocks of the output data chunk.

10. The method of claim 9, wherein the output data chunk is a first data volume, wherein the first interface is small-computer serial interface, wherein the first data volume is prepared for transmission via small-computer serial interface prior to the transmitting, and wherein the single input/output operation is a small-computer serial interface input/output operation.

11. The method of claim 9, wherein the first input/output operation at the first data block and the second input/output operation at the second data block are performed at non-consecutive data blocks with respect to the first storage device.

12. The method of claim 9, wherein the first storage device is a cache device, and the second storage device is a backing store corresponding to the cache device.

13. The method of claim 12, wherein the first input/output operation is selected from the group consisting of a cache read operation and a cache write operation.

14. The method of claim 9, wherein the output data chunk is a first data volume, and wherein the first data volume is defined using logical block addressing.

15. The method of claim 9, wherein the first data chunk is an input data chunk and the second data chunk is an output data chunk, and wherein the predetermined second number of data blocks of the second data chunk is based on the predetermined first number of data blocks of the first data chunk.

16. A system, comprising:

a hardware processor operatively coupled to a storage device;

the hardware processor configured to execute instructions, including instructions for a process, comprising:

receiving a request for a cache operation at a first storage device;

identifying at least a first input/output operation at a first data block of an input data chunk, the first data block having a corresponding first data range within the input data chunk;

identifying a second input/output operation at a second data block of the input data chunk, the second data block having a corresponding second data range within the input data chunk;

initiating a read operation at the input data chunk stored on the first storage device that comprises the first data block and the second data block;

combining the first data block and the second data block into an output data chunk comprising a predetermined number of consecutive coalesced data blocks corresponding to a single controller transmission operation, the output data chunk of consecutive coalesced data blocks having interleaved dirty data therein, wherein the single controller transmission operation is associated with a controller for use with the first storage device and a second storage device, and wherein the single controller transmission operation is defined to have the predetermined number of consecutive coalesced data blocks based on at least one input/output operation characteristic of the first storage device, the second storage device, or the controller; and writing the output data chunk of consecutive coalesced data blocks to the second storage device at the second storage device, wherein the writing is performed on consecutive data blocks of the second storage device based on the consecutive data blocks of the second data chunk.

17. The system of claim 16, wherein the instructions to be executed by the processor include instructions for implementing a serial-attached small-computer serial interface process.

18. The system of claim 16, wherein the first input/output operation at the first data block and the second input/output operation at the second data block are performed at non-consecutive data blocks with respect to the first storage device.

19. The system of claim 16, wherein the first storage device is a cache device, wherein the second storage device is a backing store corresponding to the cache device, and wherein the output data chunk is written to the second storage device as a third input/output operation.

* * * * *